United States Patent Office 2,707,489
Patented May 3, 1955

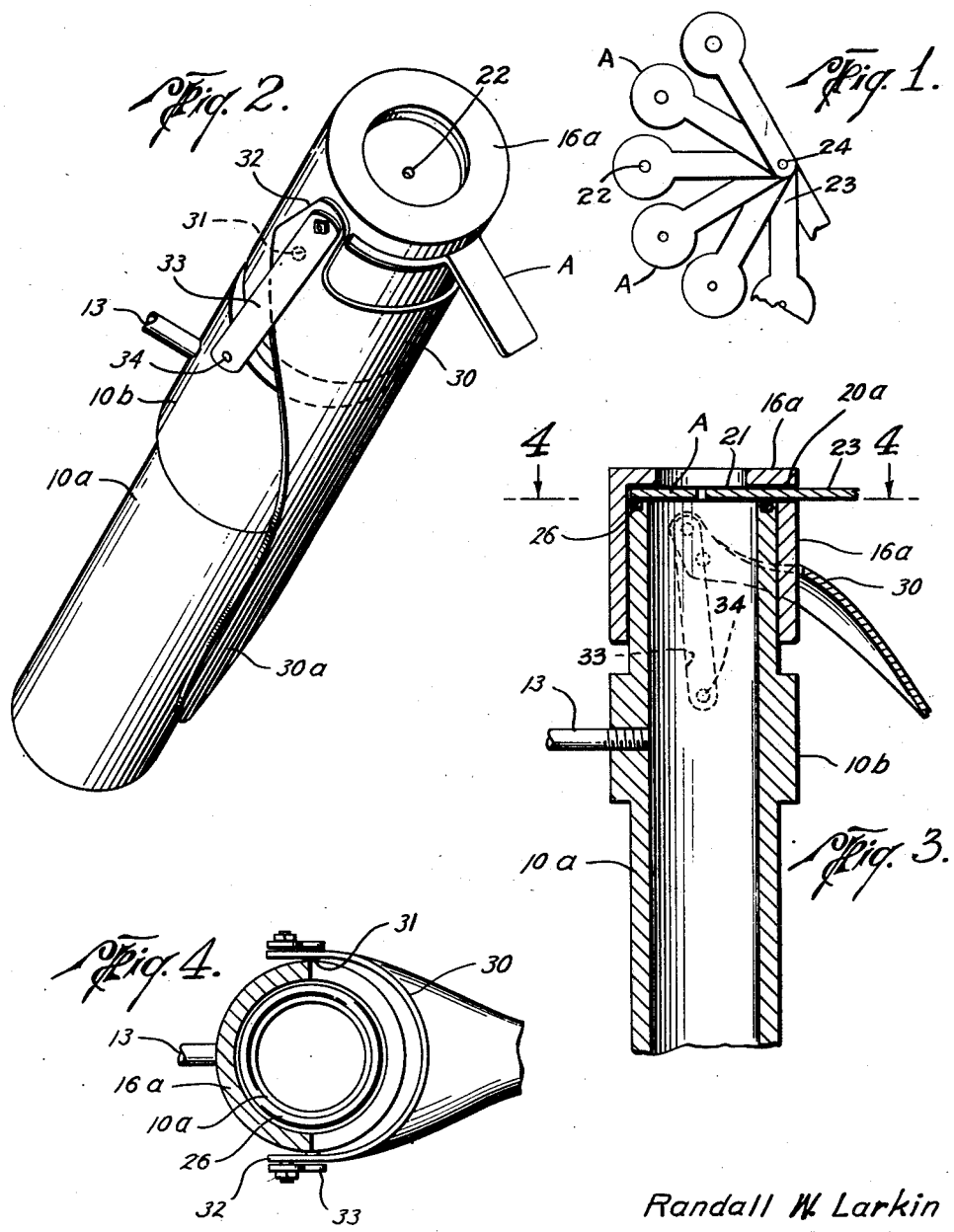
Randall W. Larkin
INVENTOR.

2,707,489

ORIFICE WELL TESTERS

Randall W. Larkin, Shreveport, La., assignor to Merla Tool Corporation, Dallas, Tex., a corporation of Texas Application July 31, 1952, Serial No. 301,883

4 Claims. (Cl. 138—45)

This invention relates to new and useful improvements in orifice well testers.

As is well known, orifice well testers are generally employed for determining the volume of gas being produced from a well so that the gas-oil ratio may be ascertained. The usual orifice well tester normally employs a body or casing having an end cap or collar which is threaded thereon. An orifice plate having the desired size opening under which the test is conducted is adapted to be confined beneath the end cap and held in place during the testing procedure. In conducting the test it is desirable to change the orifice plates so that tests under different sized orifices may be made, and in the usual type of well tester it is necessary to entirely remove the end cap to replace the orifice plate, after which the end cap must be again threaded onto the housing of the device to retain said plate. The procedure of changing the orifice plates involves considerable time because, as above pointed out, the end cap must be entirely removed and replaced each time the plate is to be changed.

It is one object of the present invention to provide an improved orifice well tester which is so constructed that the orifice plates may be quickly and easily inserted and removed to permit the desired tests to be conducted.

An important object of the invention is to provide an orifice well tester wherein the end cap or confining member which holds the orifice plate in place during the test need not be completely removed each time the plate is to be changed, whereby the conducting of the test with different orifice plates is facilitated.

A still further object is to provide a well tester of the character described, wherein the end cap or confining member which holds the plate in position is provided with a slot in its side wall, whereby the orifice plate may be inserted or removed without the necessity of entirely removing the end cap or retaining member.

A still further object is to provide a tester having a slotted end cap or retaining element, which cap is capable of a movement longitudinally of the housing or body of the device, with such movement being sufficient to permit insertion or removal of an orifice plate without requiring the complete removal of the end cap or retaining member; the longitudinal movement of the cap being effected either by means of threads or by an operating linkage.

The construction designed to carry out the invention will be hereinafter described together with other features of the invention.

The invention will be more readily understood from a reading of the following specification and by reference to the accompanying drawings, wherein an example of the invention is shown, and wherein:

Figure 1 is an elevation illustrating a plurality of the orifice plates connected together, Figure 2 is an isometric view of a modified form of the invention, Figure 3 is a longitudinal sectional view of said modified form, and Figure 4 is a transverse sectional view taken on the line 4—4 of Figure 3.

In the drawings, the numeral 10a designates a tubular body or housing which is formed with a central flange 10b thereon. The body has an axial bore extending entirely therethrough and a tube 13 mounted in the wall of the body communicates with this bore. A suitable pressure gauge (not shown) may be mounted on the tube to indicate the pressure within the bore of the body.

An orifice plate A, which comprises a circular metallic disc having a predetermined size orifice 22 extending through its central portion is adapted to abut the end of the body; the orifice plate has an integral arm or extension 23 formed thereon and this arm functions as a handle which may be grasped when the disc is to be inserted or removed into position, as will be explained. The outer end of the arm may be formed with an opening 24, whereby a bolt may be passed through the openings of a plurality of plates to secure the same together (Figure 1). It will be understood that each of the orifice plates has a different size orifice therein.

The end wall of the body of the device is provided with an annular groove which receives a packing ring 26, and when the orifice plate A is in position spanning the open end of the bore of the body, the inner surface of the marginal portion of the plate is in engagement with the end of the bore, the packing ring 26 efficiently sealing the joint between the parts.

For maintaining the orifice plate in position, an end cap 16a has a sliding engagement upon the exterior of the body. This cap has a pivotal connection at 31 with an operating member 30, the latter having an extension 30a providing a handle. The operating member is generally arcuate in cross-section and has diametrically opposite lugs 32 to each of which is pivoted one end of a toggle link 33. The other end of each toggle link is pivoted at 34 to an annular enlarged portion 10b on the body 10a.

It will be evident that when the member 30 is in a position overlying the body 10a, the end cap 16a is locked inwardly of the end of the body by the positions of the toggle links 33. The cap 16a is provided with a slot 20a which allows insertion of the orifice plate A. When the end cap 16a is in its inner position with respect to the body (Figure 2), the orifice plate A is clamped between the end cap 16a and the body, at which time the test may be conducted. A swinging of the member 30 to the position shown in Figure 3 functions to impart a movement to the end cap 16a longitudinally of the body 10a, which movement is in a direction outwardly of said body. Such movement releases the frictional contact or engagement of the cap 16a with the orifice plate and releases said plate for removal through the slot 20a.

The end cap or retaining element is provided with a radially extending slot which permits the insertion and removal of the orifice plates without the necessity of complete removal of said end cap from the body; this facilitates the conducting of tests with orifice plates having different size openings therein.

The foregoing disclosure and description of the invention is illustrative and explanatory thereof, and various changes in the size, shape and materials, as well as in the details of the illustrated construction may be made, within the scope of the appended claims, without departing from the spirit of the invention.

Having described the invention, I claim:

1. An orifice well tester including, a tubular body having one end communicating with a source of fluid supply and having its opposite end open, an orifice plate adapted to overlie the open end of the body, an annular retaining element longitudinally slidably mounted on the body and engaging the marginal portion of the orifice plate to clamp said plate in position between the end faces of the body and said retaining element, said mounting means including an operating member pivotally mounted on the body, and toggle links connecting the operating member to the body, said retaining element having an opening in its wall through which the orifice plate may be inserted into and removed from overlying position with respect to the open end of the body.

2. An orifice well tester including, a tubular body having one end communicating with a source of fluid supply and having its opposite end open, an orifice plate adapted to overlie the open end of the body, an annular retaining element longitudinally slidably mounted on the body for limited longitudinal movement thereon and engaging the marginal portion of the orifice plate to clamp said plate in position, said means including an operating member pivotally mounted on the body, and toggle links connecting said operating member to the body.

3. An orifice well tester including, a tubular body having one end communicating with a source of fluid supply and having its opposite end open, a retaining element having a collar portion slidably mounted upon the body adjacent the open end thereof, said retaining element having a flange overlying the end face of the body, an operating member pivotally mounted upon the tubular body and being generally arcuate in cross-section so as to encompass a portion of the body, diametrically opposed lugs formed on the operating member, a pair of toggle links, each toggle link having one end pivoted to one of the lugs and its opposite end pivoted to the body, the collar portion of the retaining element having a slot extending therethrough, and an orifice plate insertable through said slot into a position overlying the open end of the body, movement of the retaining element to an inward position by actuation of the operating member resulting in the retaining element clamping the marginal portion of the orifice plate between the end face of the body and the flange of said retaining element.

4. An orifice well tester as set forth in claim 3, together with sealing means mounted in the end face of the tubular body and adapted to seal with the surface of the orifice plate.

References Cited in the file of this patent

UNITED STATES PATENTS

| | | |
|---|---|---|
| 1,692,710 | Spahn | Nov. 20, 1928 |
| 2,242,467 | Hamer | May 20, 1941 |
| 2,278,849 | Hamer | Apr. 7, 1942 |
| 2,455,120 | Hamer | Nov. 30, 1948 |
| 2,661,768 | Novak et al. | Dec. 8, 1953 |